United States Patent [19]

Frank et al.

[11] Patent Number: 5,795,116
[45] Date of Patent: Aug. 18, 1998

[54] ARRANGEMENT IN A ROTATABLE DEVICE TO PROTECT AGAINST OVER-TIGHTENING

[75] Inventors: Peter Frank, Struth-Helmershof; Klaus Kraft, Asbach; Erwin Nitz, Schmalkalden, all of Germany; Magnus Aspeby, Sandviken, Sweden

[73] Assignee: Sandvik AB, Sandviken, Sweden

[21] Appl. No.: 727,572
[22] PCT Filed: Apr. 5, 1995
[86] PCT No.: PCT/SE95/00362
§ 371 Date: Mar. 10, 1997
§ 102(e) Date: Mar. 10, 1997
[87] PCT Pub. No.: WO95/29343
PCT Pub. Date: Nov. 2, 1995

[30] Foreign Application Priority Data

Apr. 25, 1994 [SE] Sweden ............... 9401394

[51] Int. Cl.⁶ ............... F16B 31/00; F16B 23/00
[52] U.S. Cl. ............... 411/6; 411/1; 411/403; 411/396
[58] Field of Search ............... 411/1, 6, 7, 402, 411/403, 408, 410, 396, 508

[56] References Cited

U.S. PATENT DOCUMENTS

| 2,931,265 | 4/1960 | De Lacy | 411/403 |
| 3,073,206 | 1/1963 | Rudolph | 411/410 |
| 3,405,595 | 10/1968 | Peterson | 411/373 |
| 4,658,558 | 4/1987 | Verble | 411/431 |
| 4,687,392 | 8/1987 | Bidwell . | |
| 5,154,557 | 10/1992 | Houck . | |
| 5,584,626 | 12/1996 | Assmundson | 411/1 |

FOREIGN PATENT DOCUMENTS 42 11 132 A1  10/1993  Germany .

*Primary Examiner*—Flemming Saether
*Attorney, Agent, or Firm*—Burns, Doane, Swecker & Mathis LLP

[57] ABSTRACT

A rotatable device, such as a screw, a bolt, etc., comprises a cylindrical clip (4) inserted into a bore (3) in the head of the rotatable device. The clip (4) is compressed to a certain extent when inserted into the bore in order to confer to the clip a springing effect on the wall of the bore. Further, the clip comprises a socket for the insertion of a suitable turning key. When turning the key, only a maximum torque is transferable to the rotatable device. If this value is exceeded, the clip starts sliding in the bore.

8 Claims, 2 Drawing Sheets

ARRANGEMENT IN A ROTATABLE DEVICE TO PROTECT AGAINST OVER-TIGHTENING

BACKGROUND OF THE INVENTION

The present invention relates to a rotatable device with a dynamometric arrangement. primarily against overtightening of threaded appliances like bolts. screws. etc.

Screw and bolt connections very often have to be tightened with a predetermined torque. so that they can fulfil predetermined practical requirements. Expensive and sensitive special tools have hitherto been necessary to apply a specific torque. If no such tools are used, there is a considerable risk of over-tightening the bolt or screw, and even to cause a rupture.

In relation with different types of adjustment screws, bolts and dials, a continued turning of the treaded part can be very detrimental, e.g., when an end value has already been reached, or when, the threaded part, or a part directly conected thereto, has been fastened in some way and this fact is overlooked by the operator, who tries to turn it around despite of its being fastened. A specific example of this is the radial fine adjustment of tool bit holders at the precision finishing of bores with rotary tools. On these tools, the tool bit holder is eccentrically displaced from the rotation axis by a radially sliding member which is adjusted by a scale or micrometer screw with a threaded shaft. When the preset radius has been attained, the sliding member is fixed with a fastening screw. After a finished boring operation, the, operator may overlook to loosen the fastening screw before turning the scale or micrometer screw, thus damaging the latter.

Thus, a first object of the present invention is to rotate rotatable appliances without exceeding a predetermined torque.

A further object of the present invention is to protect rotatable appliances against attempts to rotate when said appliance has been fixedly locked.

BRIEF DESCRIPTION OF THE DRAWINGS

For illustrative but non-limiting purposes, the invention will now be further described in relation with the appended drawings, wherein.

DETAILED DESCRIPTION OF THE PREFERRED EMBODIMENTS

Figure 1:
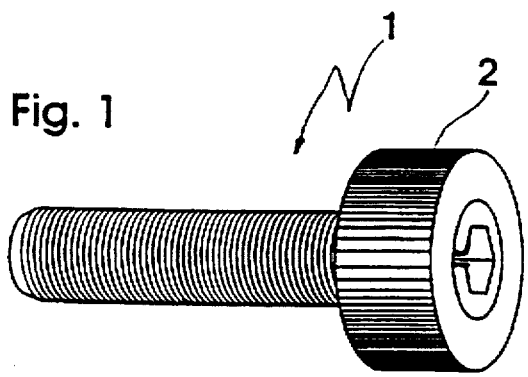
FIG. 1 shows a perspective view of a bolt comprising a protective arrangement according to the present invention.
Figure 2:
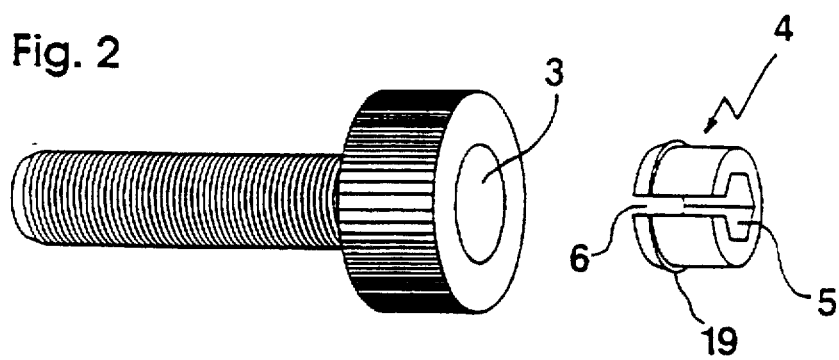
FIG. 2 is the same bolt as in FIG. 1, with the protective arrangement taken apart.
Figure 3:
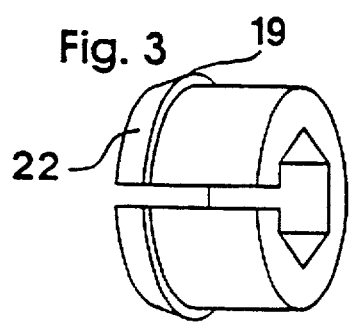
FIG. 3 shows in perspective a sleeve clip according to the present invention.

FIGS. 1 and 2 show a bolt 1 with a lead 2. A cylindrical bore 3 is provided on the top surface of head 2. Bore 3 is concentric with the axial extension of bolt 1. A clip 4 of basic cylindrical shape is fitted into bore 3. Clip 4 according to FIG. 1 and 2 has a socket 5 of hexagonal cross-section. Socket 5 and the outer envelope surface of the clip are connected via a slot 6. The slot can be made either along one of the corners of the hexagon (FIG. 2) or in the middle of one of the sides of the hexagon, thus splitting the side into two parts (FIG. 3). A suitable key of hexagonal cross-section can be inserted into the socket 5 in order to rotate the bolt.

When clip 4 is in bore 3, it must press firmly against the cylindrical wall of the bore. In order to achieve this, the clip music be pressed together by approaching the two flat, congruent surfaces facing slot 6. Suitably, the clip is pressed together by pliers and then it is inserted into bore 3, whereafter it is let free to expand and press against the bore wall. The clip is made of a suitable spring steel so that the friction joint in the bore becomes sufficiently strong by the inherent spring effect of the steel. By this friction, a predetermined maximum torque or torque range is transferred from the clip to the bore wall. A suitable steel for the clip should preferrably have a spring steel hardness of 43 to 50 Rockwell. As a mere example, a steel with the designation 50 CRV4 can be used.

Figure 4:
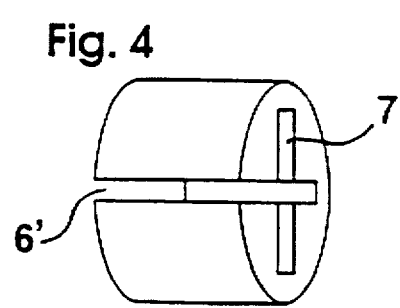
FIG. 4 shows another embodiment of a clip according to the present invention.
Figure 5:
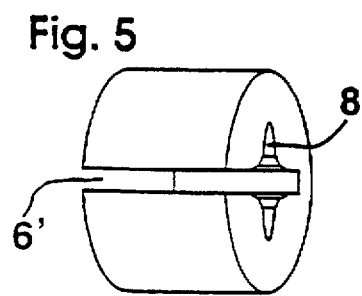
FIG. 5 is still another embodiment of a clip according to the present invention.
Figure 6:
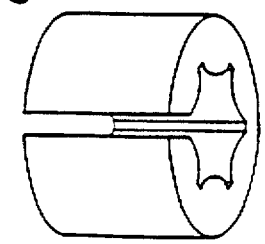
FIG. 6 is still another embodiment of a clip according to the present invention.

The socket can have any suitable cross-section, in order to match to a corresponding key. As an example, it can have a square cross section. Further, it can have a cross-section known as "torx", fitting to a torx-key, cf. FIG. 6. Although a less preferred embodiment, the clip according to the present invention can also be formed in order to fit to a normal screw-driver (FIG. 4) or to a "Philip"-key, FIG. 5. The two latter embodiments do not comprise a socket as FIG. 1, 2, 3 and 6, but rather a slot 6'which extends radially from the envelope surface and past the center axis of the clip. In FIG. 4, slit 7 intended for a screw-driver, extends radially and perpendicularly to slot 6'and equally far on both sides of slot 6'. In FIG. 5, recesses 8 are formed to fit to a Philip-key, whereby the two perpendicular protrusions of the Philip-key fit into slot 6'.

Figure 7:
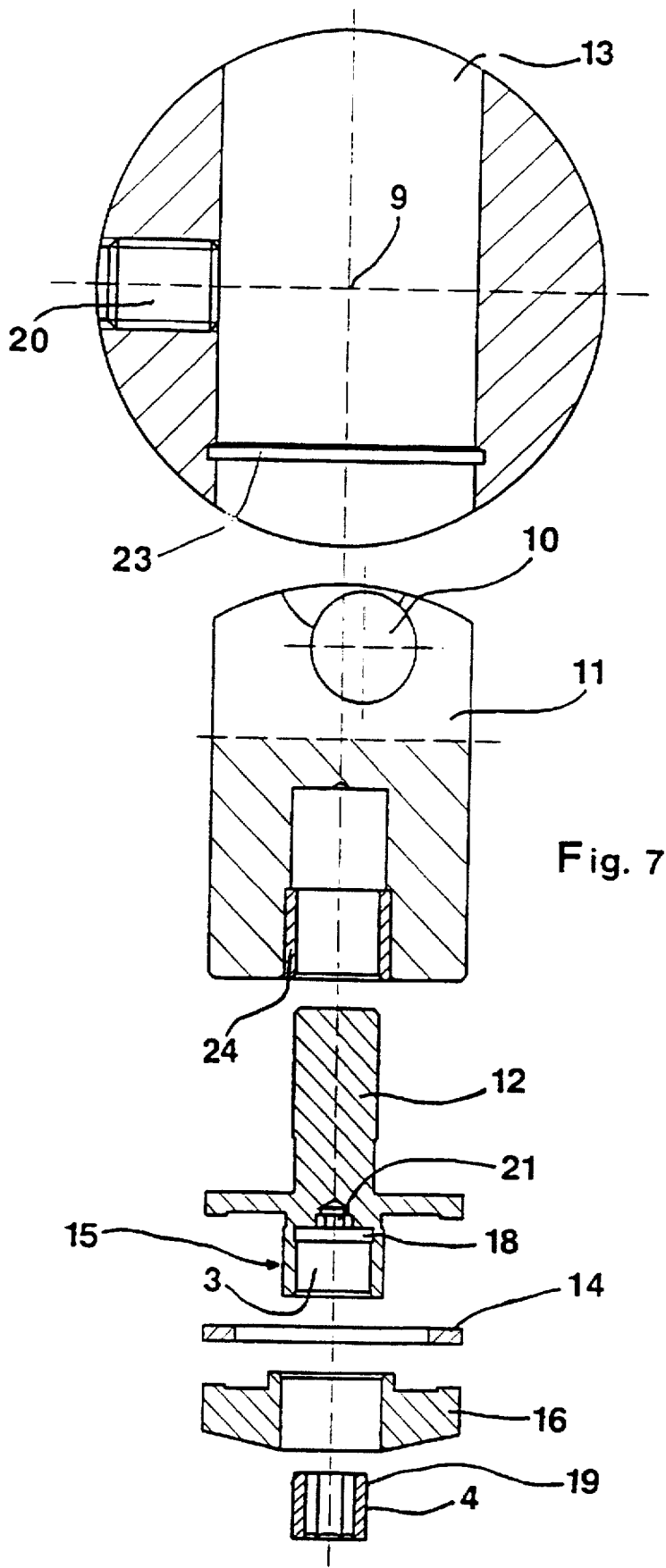
FIG. 7 shows a radial cross-section of a balanced boring head illustrating an application of the arrangement according to the present invention.

As an mere example, FIG. 7 shows an application of the present invention in a balanced boring head, in an exploded view of a radial cross-section. It could equally well be used for an unbalanced boring tool. Numeral 9 designates the rotation axis of the boring head and 10 is the orifice for inserting the tool bit holder or boring bar. This bar is eccentrically positioned in order to finish and smoothen the surface of a pre-drilled hole. Bar 10 is fastened in sliding member 11 which can be slid radially in a bore 13 by screw means 12. Screw means 12 is threaded into sliding member 11, preferrably via an internally threaded cylinder 24 of red brass which is fixedly attached to the sliding member. Further, screw means 12 is radially retained by interrupted retaining ring 14. This ring is snugly fit into annular recess 23 in bore 13. Head 15 of screw means 12 protrudes through retaining ring 14 and is fixedly but rotatably joined with scale dial 16 (retaining ring 14 is non-rotatable). Head 15 comprises a bore 3 for inserting a clip 4 according to FIG. 3. At the bottom of bore 3 there is provided an annular groove 18 of slightly larger diameter than bore 3. Clip 4 comprises a corresponding annular protrusion or shelf 19 which is arranged to snap into groove 18 and lock the clip axially, thus preventing it from falling out of bore 3. Obviously, the protrusion 19 can also be divided into a plurality of segments, whereby the spaces between the protruding segments form part of the cylindrical envelope surface. The rear part of shelf 19 is formed of a conically sloping wall in order to ease the insertion of the clip into bore 3. When sliding member 11 has reached its predetermined position, it is fixedly locked by locking or clamping screw 20. When the operator later intends to re-position sliding member 11 by turning dial scale 16 and screw means 12, he may overlook to first loosen locking screw 20. In the cases where the thread of screw means 12 has a very small pitch angle, which is the case with finely adjustable boring tools, he/she may not even feel the resistance exerted by locking screw 20. In these cases, the thread of screw means 12 and/or of sliding member 11 and/or other parts of the assembly, may become irreversibly damaged. Now, with clip 4 of the present invention inserted into screw means 12, the only thing that happens when the operator forgets to loosen clamping screw 20 is that the clip starts rotating in bore 3.

Instances may occur, where a rotatable appliance according to the present invention needs to be rotated in spite of the fact that clip 4 rotates in its bore, e.g., where a bolt has become stuck because of rust after a long time of non-use. Therefore, according to a preferred embodiment of the present invention, the bottom of bore 3 is provided with a hole 21 of suitable cross-section, of smaller diameter than bore 3. Suitably, hole 21 is of hexagonal shape. Hence, with a minor hexagon key, the screw means can be rotated despite the fact that clip 4 rotates.

We claim:

1. A torque limiting device for a rotatable device, comprising:

a clip of a basic cylindrical shape adapted to be inserted into a bore in the rotatable device, the clip has an axially extending slot which is adapted to be compressed to a certain extent when the clip is inserted into the bore in order to confer to the clip a springing effect on the cylindrical wall of the bore, and the clip including a socket which is a through-hole of hexagonal or square cross-section, whereby the slot extends axially from one end to the other of the clip and radially from an outer surface of the clip to the socket.

2. The device according to claim 1, wherein the clip is coaxial with an axis of rotation of the rotatable device.

3. The device according to claim 1, wherein the socket is for inserting a turning key.

4. The device according to claim 1, wherein the bore adjacent to its bottom has an annular groove while the clip at one of its ends has a circumferential protrusion or shelf whereby the protrusion or shelf is snapped into the groove thus axially locking the clip in the bore.

5. The device according to claim 1, wherein the device is a threaded body, like a bolt or a screw.

6. A torque limiting device for a rotatable device, comprising:

a clip of basic cylindrical shape adapted to be inserted into a bore in the rotatable device, the clip has an axially extending slot which is adapted to be compressed to a certain extent when the clip is inserted into the bore in order to confer to the clip a springing effect on the cylindrical wall of the bore, wherein a bottom surface of the bore is provided with a hole of a smaller diameter than the bore, the hole being adapted for insertion of a suitable turning key for rotating the rotatable device.

7. The device of claim 6, wherein the rotatable device is a threaded body, like a bolt or a screw.

8. The device of claim 6, wherein the clip is coaxial with an axis of rotation of the rotatable device.

* * * * *